United States Patent [19]

Wust

[11] Patent Number: 4,973,868
[45] Date of Patent: Nov. 27, 1990

[54] ELECTRICAL MACHINE WITH PERMANENT MAGNET EXCITATION

[75] Inventor: Bernhard Wust, Giengen, Fed. Rep. of Germany

[73] Assignee: J. M. Voith GmbH, Heidenheim, Fed. Rep. of Germany

[21] Appl. No.: 387,331

[22] Filed: Jul. 28, 1989

[30] Foreign Application Priority Data

Aug. 3, 1988 [DE] Fed. Rep. of Germany ....... 3826339

[51] Int. Cl.⁵ ............................................. H02K 5/24
[52] U.S. Cl. ...................................... 310/51; 310/43; 310/90; 310/156; 310/266; 74/574
[58] Field of Search ............... 310/261, 264, 265, 266, 310/269, 254, 42, 43, 51, 90, 49 R, 156, 179, 267, 180, 185, 162, 163, 164, 216; 336/100; 74/574

[56] References Cited

U.S. PATENT DOCUMENTS

| | | | |
|---|---|---|---|
| 2,418,607 | 4/1947 | Suydam | 310/266 |
| 3,396,288 | 8/1968 | Patrignani | 310/43 |
| 4,433,260 | 2/1984 | Weisbord | 310/261 |
| 4,754,183 | 6/1988 | Gerber | 310/156 |

FOREIGN PATENT DOCUMENTS

| | | | |
|---|---|---|---|
| 3536538 | 4/1987 | Fed. Rep. of Germany | 310/266 M X |
| 3705089 | 8/1988 | Fed. Rep. of Germany | 310/261 M X |
| 0012408 | 1/1977 | Japan | 310/266 |
| 0095091 | 3/1960 | Netherlands | 310/266 |

*Primary Examiner*—R. Skudy
*Attorney, Agent, or Firm*—Jeffers, Hoffman & Niewyk

[57] ABSTRACT

Contained in an electrical machine with a field excited by permanent magnets, on the rotor, are pole bodies that extend in ring fashion and coaxially with the rotor shaft, forming between stator pole shoes an air gap. The rotor consists of a specific sequence of permanent magnets and soft iron components which alternately are arranged side by side and jointly embedded in plastic. This gives the rotor a labile structure with a low modulus of elasticity. Apart from the present invention, the air gap could change during operation through vibrations, specifically flexural vibrations. This could lead to losses in efficiency and, most of all, considerable noise generation. A massive damping ring is provided on the free ends of the pole bodies, possibly bearing on the stator housing, which provides for a smooth running of the machine.

11 Claims, 1 Drawing Sheet

ELECTRICAL MACHINE WITH PERMANENT MAGNET EXCITATION

BACKGROUND OF THE INVENTION

The invention concerns an electrical machine, specifically a rectifier-energized synchronous machine with permanent magnet excitation. A machine of this category is known from the unpublished German Patent Disclosure No. 37 05 089.3.

The peculiarity of this design is constituted by the fact that the rotor comprises essentially a central disk to which, in the area of the outer circumference and on both sides, a ring-shaped pole body structure that is coaxial with the rotor shaft is attached. This pole body structure consists of a defined sequence of permanent magnets and soft iron components which alternately are arranged side by side and in peripheral direction.

The permanent magnets and soft iron components are jointly embedded in plastic, true to measure and in ring-shaped fashion, and as well fastened on the central disk in axial direction. The central disk itself consists preferably of fiber-reinforced plastic. The free end of each pole body structure, away from the disk, features a cover plate which consists as well of plastic.

Arranged around the inner and outer circumference of the pole body structure are pole elements which are integral parts of the stator of the machine and feature inside coils through which flows current. Directed toward the pole body structure of the rotor are open pole shoes which, except for a slight air gap, extend up to the rotor.

The magnetic flux properties demand that the rotor, in its supporting mechanical components, be made extensively from plastic. The pole body is thus given an inhomogeneous structure where, for one, the metallic permanent magnets and soft iron components are embedded with their mass in plastic which, on the other hand, however, has a modulus of elasticity that is about ten times as low as that of steel. Consequently, the rotor is a labile component which operationally tends to any type of vibrations, specifically flexural vibrations. This, in turn, leads to unequal air gaps between the pole bodies and pole shoes. Unfavorable in this context are not only air gap differences between the right hand and left hand side but specifically between the air gaps on the inner and outer circumference of the pole bodies. The result is a disturbed flux line pattern during rotation, which expresses itself in a considerable noise generation and poor efficiency. Therefore, machines of this type cannot be manufactured yet for higher output and/or speed of rotation.

The problem underlying the invention is to so design an electrical machine according to the categorial definition that the run performance of the rotor will be improved and the capacity of the machine can be increased.

SUMMARY OF THE INVENTION

The problem stated above is solved through the features of the present invention. The invention provides for arrangement of massive rings on the free ends of the ring-shaped pole bodies, away from the central disk. These disks serve the form stabilization of the pole bodies during operation and assure consistent roundness and, thus, constant air gaps between the pole shoes and the pole bodies of the rotor. This reduces the noise generation and provides through improvement of the efficiency the prerequisite for designing the electrical machine for a higher capacity.

Further favorable developments of the invention are set forth herein. The massive rings are preferably made from fiber-reinforced plastic, making it possible to fasten them in a space-saving fashion close to the permanent magnets, without affecting the magnetic flux. A particular advantage lies in the fact that the rings may extend radially inward toward the rotor shaft, making it possible, additionally, to provide a mounting that is arranged in the stator housing, specifically by means of an antifriction bearing. The result is a further solidification of the rotor in the sense of improving the smoothness of running. The ring may in a partial area be so designed that it will yield slightly at least in radial direction. This will equalize distortions in the housing or in the rotor, without affecting the air gaps. Additionally, it is also possible to enlarge the rings radially, inwardly and outwardly, up into the area of the pole shoes. This makes it possible to forego under certain conditions an additional mounting or support in the stator housing, because the ring enveloping the ends of the pole bodies is quite rigid itself.

BRIEF DESCRIPTION OF THE DRAWING

Two embodiments of the invention will be more fully explained hereafter with the aid of the drawing.

DESCRIPTION OF THE PREFERRED EMBODIMENTS

Figure 1:
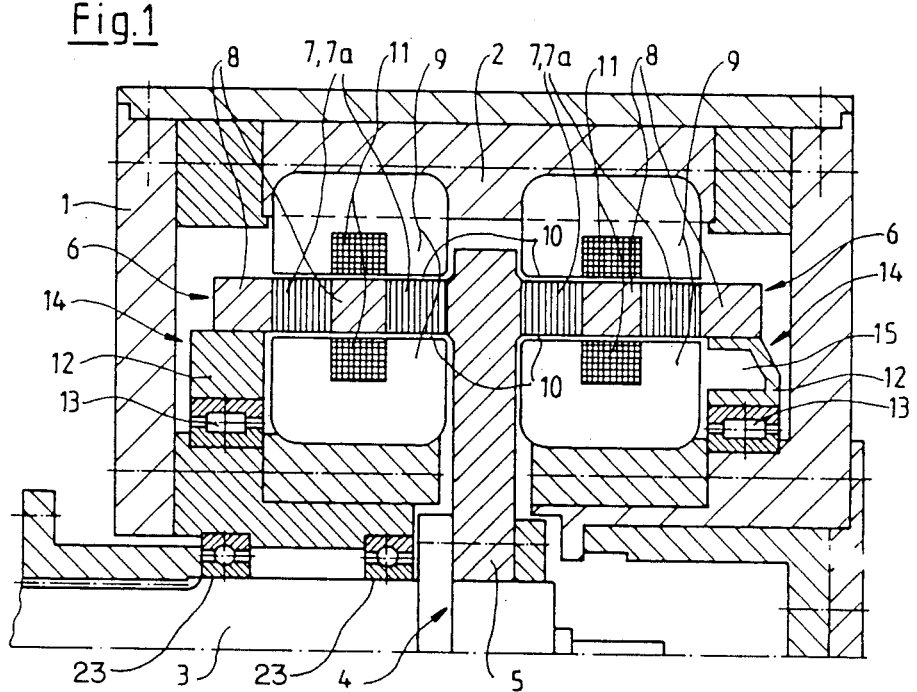
FIG. 1 shows schematically a partial longitudinal section of a motor with a supported rotor.

Marked 1 in FIG. 1 is a stator housing in which a rotor shaft 3 is rotatably mounted by means of antifriction bearing 23. Fastened on this rotor shaft, on a flange, is a rotor 4. The latter comprises a central disk 5 on which border, on its outer circumference, ring-shaped pole bodies 6 that are coaxial with the rotor shaft 3. The inner design of the rotor 4 corresponds to that known from the German Patent Disclosure No. 37 05 089. The pole bodies 6 consist of a specific sequence of permanent magnets 7 and soft iron components 7a which are arranged alternately side by side and in peripheral direction, and which jointly with ring-shaped elements 8 are embedded in plastic between and beside the permanent magnets.

Radially inward of and outward of the pole bodies 6 there are pole shoes 9 arranged on the stator housing 1 in such a way that relative to the pole bodies 6, at least in the area of the permanent magnets 7, radial air gaps 10 will be created. The pole shoes 9 are distributed across the entire circumference and permeated by windings 11. They form a stator 2 of the motor that is arranged, fixed, in the stator housing 1. Radially inward of the outermost ring-shaped element 8 opposite the central disk 5, a massive ring 12, in the form of a round central disk of fiber-reinforced plastic, is arranged. This ring 12 is supported on the stator housing 1 by means of a sealed bearing 13 enclosed by ring 12. The right hand part of FIG. 1 illustrates how the massive ring 12 can be provided, in a partial area 14, with recesses 15. This creates a slight radial and/or axial flexibility between the rotor and the stator housing 1, keeping the pole bodies free from an harmful constraining forces. The support effect provided by the bearing 13 is upheld nonetheless.

Figure 2:
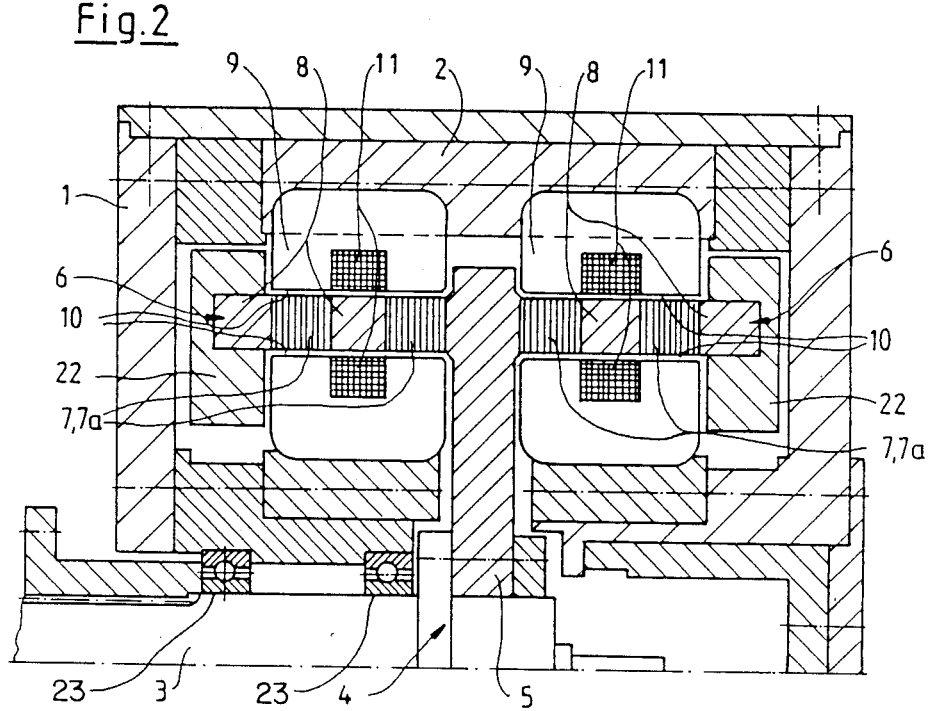
FIG. 2 shows schematically a partial longitudinal section the same as FIG. 1, where the rotor features a massive reinforcement ring without bearing.

In FIG. 2, identical parts have been tagged using identical reference symbols. The illustrated motor corresponds in its design with that of FIG. 1. On the ends of the pole bodies 6 opposite the central disk there is located a massive ring 22 each that extends both radially inward and radially outward of the central disk, thus representing a rigid component. Depending on the size of the motor or the housing design or other design conditions, such provision of a reinforcing ring makes it possible to forego a mounting or support on the gear housing 1.

It goes without saying that the rings 12 and 22 according to FIGS. 1 and 2, respectively, can for damping and reinforcement of the pole bodies be inserted and fastened only toward the end of the assembly process. Consequently, the stator housing requires a split design. Details in that respect are not illustrated specifically.

What is claimed is:

1. An electrical motor with a field excited by permanent magnets comprising:

a stator housing;

a rotor including a rotor shaft mounted in said stator housing and having a round central disk of fiber-reinforced plastic extending substantially radially from and fixed to said rotor shaft for rotation therewith;

a ring-shaped pole body coaxial with the rotor shaft and connected to the outer periphery of the central disk, said ring-shaped pole body extending axially in opposite directions from the central disk and having an inner circumferential surface, an outer circumferential surface and free axial end faces, said ring-shaped pole body including alternately arranged permanent magnets and soft iron components embedded in plastic and connected with each other thereby;

ring-shaped pole shoes having windings and being fixed to said stator housing and arranged radially inward of and outward of the pole body so as to envelop the pole body on the entire inner and outer circumference thereof, except for the free axial end faces thereof;

said ring-shaped pole body and said ring-shaped pole shoes defining therebetween annular air gaps; and a pair of massive rings for stabilization of the rotor against running vibrations, each fastened on a free end face of the ring-shaped pole body.

2. An electrical motor according to claim 1, in which each massive ring is composed of plastic.

3. An electrical motor according to claim 1, in which each massive ring is supported on the stator housing through a bearing.

4. An electrical motor according to claim 2, in which each massive ring is supported on the stator housing through a bearing.

5. An electrical motor according to claim 3, in which the massive ring extends radially inward of said ring-shaped pole body.

6. An electrical motor according to claim 3, in which the bearing is an antifriction bearing which is enclosed by the massive ring.

7. An electrical motor according to claim 5, in which the bearing is an antifriction bearing which is enclosed by the massive ring.

8. An electrical motor according to claim 5, in which the massive ring is, at least in a partial area between the pole body and the bearing, flexible at least radially.

9. An electrical motor according to claim 6, in which the massive ring is, at least in a partial area between the pole body and the bearing, flexible at least radially.

10. An electrical motor according to claim 1, in which the massive ring extends radially outward and inward from the pole body toward the area of the pole shoes.

11. An electrical motor according to claim 2, in which the massive ring extends radially outward and inward from the pole body toward the area of the pole shoes.

* * * * *